United States Patent
Chang

(10) Patent No.: US 11,719,269 B2
(45) Date of Patent: Aug. 8, 2023

(54) CORNER BRACKET WITH REINFORCING RIBS

(71) Applicant: Chiao-Yin Chang, Taichung (TW)

(72) Inventor: Chiao-Yin Chang, Taichung (TW)

( * ) Notice: Subject to any disclaimer, the term of this patent is extended or adjusted under 35 U.S.C. 154(b) by 38 days.

(21) Appl. No.: 17/373,317

(22) Filed: Jul. 12, 2021

(65) Prior Publication Data

US 2023/0011291 A1    Jan. 12, 2023

(51) Int. Cl.
    *F16B 12/50*    (2006.01)

(52) U.S. Cl.
    CPC .................................. *F16B 12/50* (2013.01)

(58) Field of Classification Search
    CPC ...... Y10T 403/73; Y10T 403/42; F16B 12/28; F16B 12/44; F16B 12/50; F16B 9/052; F16B 7/048; F16B 7/0493
    USPC ...................................... 248/220.1, 248, 300
    See application file for complete search history.

(56) References Cited

U.S. PATENT DOCUMENTS

| | | | | |
|---|---|---|---|---|
| 491,091 A * | 2/1893 | Drake | ................... | F22B 37/202 248/300 |
| 5,402,976 A * | 4/1995 | Pollack | ................... | A47B 97/04 248/455 |
| 6,213,679 B1 * | 4/2001 | Frobosilo | ................... | E04B 2/96 403/14 |
| 6,318,692 B1 * | 11/2001 | Cyrell | ................... | F16M 11/14 248/316.1 |
| 6,874,969 B2 * | 4/2005 | Jadaud | ................ | H02G 3/0608 403/92 |
| 7,478,508 B2 * | 1/2009 | Peterson | ................... | E04B 2/96 248/300 |
| 8,975,519 B2 * | 3/2015 | Lalancette | ........... | H05K 5/0204 248/300 |

FOREIGN PATENT DOCUMENTS

| | | | | |
|---|---|---|---|---|
| DE | 102008052606 A1 * | 4/2010 | ........... | A47B 96/063 |
| EP | 1722111 A1 * | 11/2006 | ............... | E04B 9/16 |
| GB | 2487938 A * | 8/2012 | ............. | A47B 96/06 |
| WO | WO-2014068894 A1 * | 5/2014 | ........... | A47B 13/021 |

* cited by examiner

*Primary Examiner* — Matthew R McMahon

(74) *Attorney, Agent, or Firm* — Muncy, Geissler, Olds & Lowe, P.C.

(57) ABSTRACT

A corner bracket with reinforcing ribs comprises: a first fixing plate and a second fixing plate, the first and the second fixing plates are connected to each other at a dihedral angle, the first and the second fixing plate being respectively configured with a pair of a first reinforcing ribs and a second reinforcing ribs along their longitudinal direction, and the first and the second reinforcing ribs unify entirely with each other.

6 Claims, 2 Drawing Sheets

CORNER BRACKET WITH REINFORCING RIBS

BACKGROUND OF THE INVENTION

1. Field of the Invention

The disclosed invention regards to a metal part with a preferable structural strength; specifically, to a corner bracket which integrates with reinforcing ribs.

2. Description of the Related Art

In the existing technology, the angle iron plays a crucial part in linking steel frames. The pervasive methods of securing structure strength is either the application of an L-shape angle iron, forged by a stamping machine or the soldering operation of welding struts onto the center part or both sides of the angle iron. However, the former sacrifices its property of stiffness for another one of ductility and malleability during molding procedure, and the latter requires repetitive process times and consumes more row material contributing to an unguaranteed structural quality with a hidden worry whether the welding parts making a solid and tightly integration.

SUMMARY OF THE INVENTION

Seeing these drawbacks, this invention aims to provide a corner bracket with reinforcing ribs having the advantages of an advanced structural strength, integrated all components and a streamlined procedure, saving time and times, and a reduced material cost.

To achieve the aforementioned goal, the provided corner bracket with reinforcing ribs comprises a first fixing plate and a second fixing plate. The first fixing plate has a first inner surface and a first outer surface and the second fixing plate has a second inner surface and a second outer surface. The first and the second fixing plates intersect at a dihedral angle. Wherein, the first fixing plate forms at least a pair of the first reinforcing ribs which bulge up the first inner surface, dent down the first outer surface, and extend along a longitudinal direction of the first fixing plate. The second fixing plate forms at least a pair of the second reinforcing ribs which bulge up the second inner surface, dent down the second outer surface, and extend along a longitudinal direction of the second fixing plate. The first reinforcing ribs are connected to the second reinforcing ribs.

This invention integrates as a whole in one stage of the molding procedure by embossing the silhouette of the reinforcing ribs onto the first and the second fixing plates, which has advantages of waiving filler material and the following cost, and producing speedily but having a structural strength advanced apparently. Therefore, this invention satisfies all of the requirements such as high efficiency, stiffness, durability, versatility, high safety for long-term use, and solve the existing problems with inferior strength and higher producing cost of the angle iron.

DETAILED DESCRIPTION OF PREFERRED EMBODIMENTS

Figure 1:
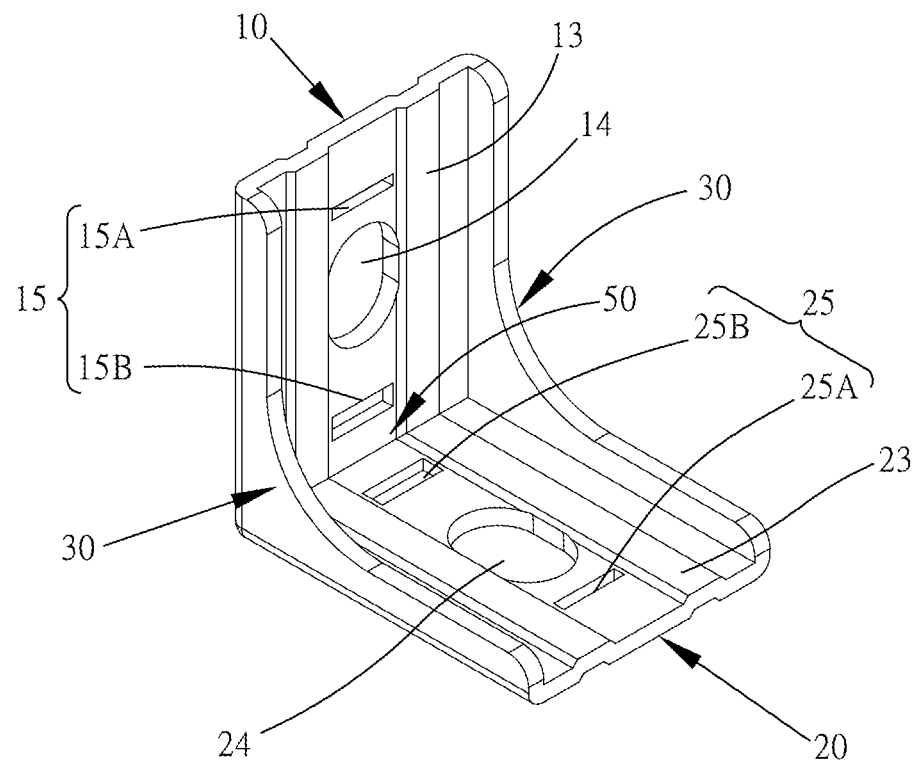
FIG. 1 is a perspective view of an embodiment of a corner bracket.
Figure 2:
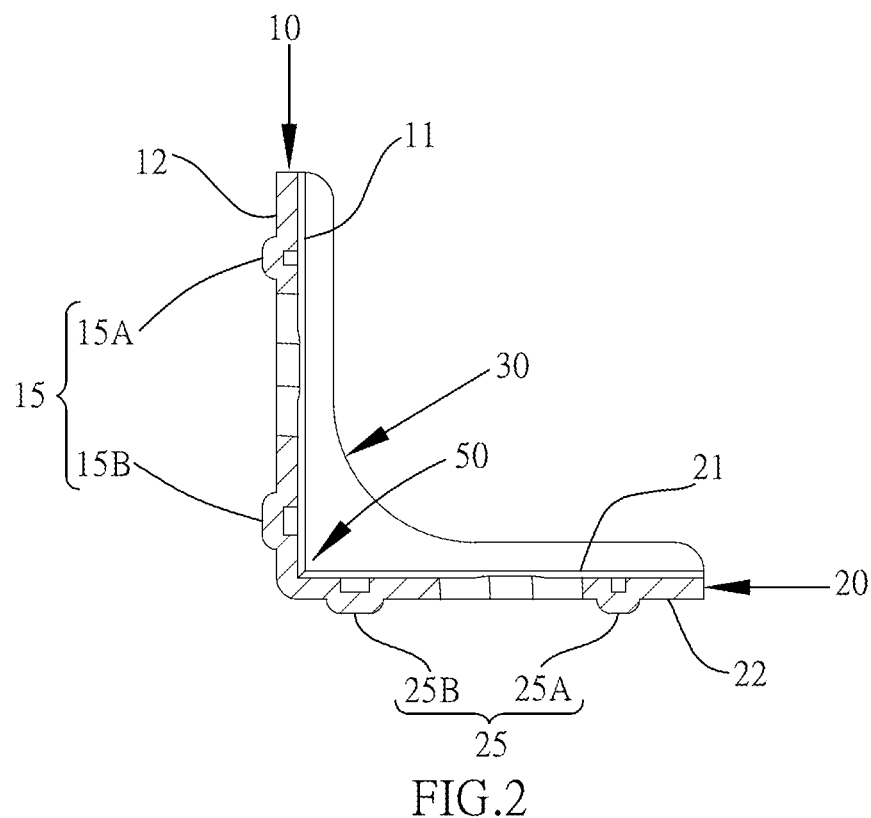
FIG. 2 is a sectional view of the embodiment of the corner bracket.
Figure 3:
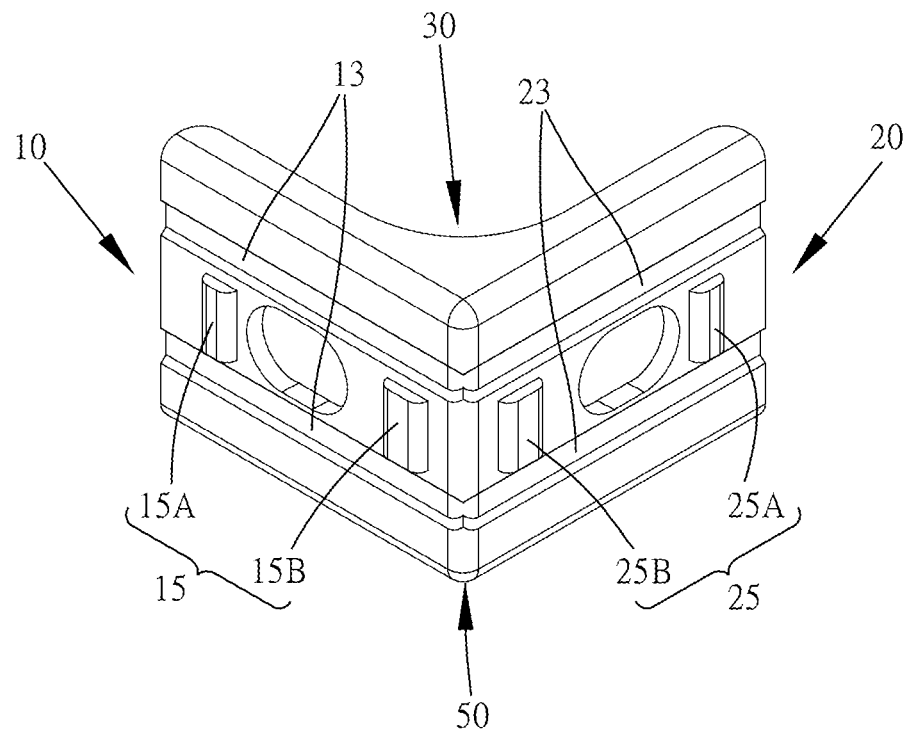
FIG. 3 is a closer view of the embodiment of the corner bracket looking from the backside.

FIG. 1 and FIG. 2 illustrating the embodiments of a corner bracket with reinforcing ribs, comprises a first fixing plate 10 and a second fixing plate 20 which is made of a blank of metal such as steel, iron or other alloy. In the sectional view of FIG. 2, the first fixing plate 10 unifies the second fixing plate 20 at a dihedral angle 50 of a rough L shape.

The corner bracket has the first fixing plate 10 and the second fixing plate 20 forged by a stamping machine. The first fixing plate 10 has a first inner surface 11 and a first outer surface 12, and the second fixing plate 20 has a second inner surface 21 and a second outer surface 22. These two fixing plates 10, 20 connect at a dihedral angle 50, between 45 to 135 degrees, which is a right angle in this embodiment.

The first fixing plate 10 forms at least a pair of the first reinforcing ribs 13 which bulge up the first inner surface 11 and dent down the first outer surface 12. To be more specifically, the pair of the first reinforcing ribs 13 of the first fixing plate 10 are forged by the stamping machine to have an appearance of two plateaus bulging up in parallel looking from the first inner surface 11 and have another appearance of two trenches denting down in parallel looking from the first outer surface 12. Both of them extend along the longitudinal direction of the first fixing plate 10. The second fixing plate 20 forms at least a pair of the second reinforcing ribs 23 which bulge up the second inner surface 21 and dent down the second outer surface 22. To be more specifically, the second reinforcing ribs 23 are forged by the stamping machine to have an appearance of two plateaus bulging up in parallel looking from the second inner surface 21 and have another appearance of two trenches denting down in parallel looking from the second outer surface 22. Both of them extend along the longitudinal direction of the second fixing plate 20.

The first reinforcing ribs 13 and the second reinforcing ribs 23 unify at which the first fixing plate 10 and the second fixing plate 20 intersect.

In this embodiment, the first reinforcing ribs 13 have the number of two and a length the same as that of the first fixing plate 10; the second reinforcing ribs 23 have the number of two and a length the same as that of the second fixing plate 20. Furthermore, this invention is an advanced angle iron. The first and the second fixing plates 10, 20 of the corner bracket with reinforcing ribs have respectively deployed with a locking hole 14, 24 and a pair of positioning parts 15, 25. Wherein, the locking holes 14, 24 are individually engaged with screw bolts 40 for securing the corner bracket onto the steel frame and form a shape of circle or oval corresponding to that of the screw bolts, and the positioning parts 15, 25 serve for orientation ensuring the corner bracket being mounted onto the steel frame in an align, not sloping, position.

Continuing to the embodiments shown as in FIG. 1 to FIG. 4, the number of the positioning parts 15 of the first fixing plate 10 is two, a pair, and so is the positioning parts 25 of the second fixing plate 20. Two pairs of the positioning parts 15, 25 are respectively arranged on both sides of the locking holes 14, 24 along the latitudinal direction of the first and the second fixing plate 10, 20. The positioning parts 15, 25, forged by the stamping machine which embosses onto the first and the second fixing plate 10, 20, bulges up the positioning parts 15, 25 from the first and the second outer surfaces 12, 22 and dents down the first and the second inner surfaces 11, 21 of the first and the second fixing plate 10, 20. In this way, this invention merits a streamline procedure without filler material.

Each of the positioning parts 15A, 15B, 25A, 25B has a width along the longitudinal direction of the first fixing plate 10 and the second fixing plate 20.

The width of the positioning parts 15B, 25B adjacent to the dihedral angle 50 between the first fixing plate 10 and the second fixing plate 20 is greater than the width of the positioning parts 15A, 25A placed away from the dihedral angle 50 between the first fixing plate 10 and the second fixing plate 20.

Figure 4:
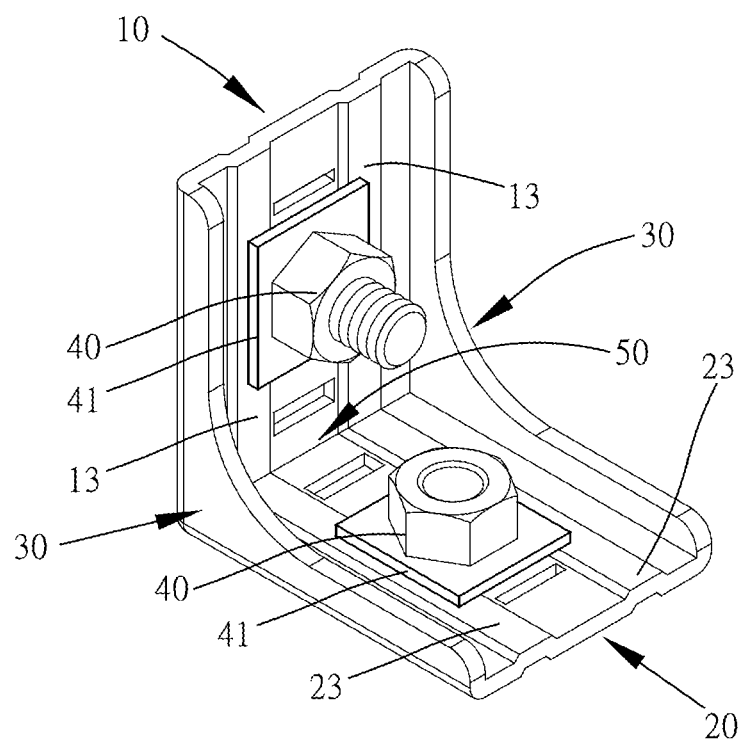
FIG. 4 is another perspective view of the embodiment of the corner bracket coupled up by screw bolts.

In the embodiment shown as in FIG. 4, the first reinforcing ribs 13 are deployed in parallel on both sides of the locking hole 14 of the first fixing plate 10, and the second reinforcing ribs 23 are deployed in parallel on both sides of the locking hole 24 of the second fixing plate 20. Two pieces of washers 41 are individually coupled to the locking holes 14, 24 as a buffer between the corner bracket and the screw bolts 40 to prevent the rotation of the screw bolts 40. Preferably, a spring washer performs better in compact sealing than that of the aforementioned washers 41.

Besides, the reinforcing ribs 13, 23 may as well absorb some of the vibration to prevent any loosen screw bolt 40 resulting from long-time vibration.

Apart from the deployment of the first and the second reinforcing ribs 13, 23 of the first and the second fixing plate 10, 20, this invention further replenishes a pair of reinforcing curbs 30 beside dihedral edges of the first and the second fixing plates 10, 20. The pair of reinforcing curbs 30 are fabricated integrally in one go of the molding procedure. During the molding process, when the stamping machine is processing to the corner part of the metal blank, a preserved material fed in accordingly from the latitudinal direction for fabricating a pair of the reinforcing curbs 30 beside the dihedral edges of the first and the second fixing plates 10, 20. The pair of the reinforcing curbs 30 enhance the structure strength of the corner bracket and complete in one go of molding process without fussy procedure.

All of the components of the corner bracket with reinforcing ribs are forged integrally from the cold press die having merits of a much stronger structure without fussy workmanships, saving time and times of the molding procedure, and also economizing on the row material.

What is claimed is:

1. A corner bracket with reinforcing ribs comprises:
   a first fixing plate, having a first inner surface and a first outer surface;
   a second fixing plate, having a second inner surface and a second outer surface;
   the first fixing plate and the second fixing plate being connected to each other at a dihedral angle,
   wherein, the first fixing plate forming at least one pair of first reinforcing ribs which bulge up the first inner surface, dent down the first outer surface, and extend along a longitudinal direction of the first fixing plate;
   the second fixing plate forming at least one pair of second reinforcing ribs which bulge up the second inner surface, dent down the second outer surface, and extend along a longitudinal direction of the second fixing plate;
   the first reinforcing ribs and the second reinforcing ribs being connected integrally to each other;
   wherein, the first reinforcing ribs have a length the same as that of the first fixing plate, and the second reinforcing ribs having a length the same as that of the second fixing plate;
   wherein, the first fixing plate and the second fixing plate form respectively a locking hole and a pair of positioning parts, and the pair of positioning parts are deployed on both sides of the locking holes along a latitudinal direction of the first fixing plate and the second fixing plate;
   wherein, the positioning parts bulge up the first outer surface and the second outer surface and dent down the first inner surface and the second inner surface;
   wherein, the locking holes are individually engaged with screw bolts; and the screw bolts are pressed against the first reinforcing ribs and the second reinforcing ribs which bulge up the first fixing plate and the second fixing plate;
   wherein, a width of the positioning parts adjacent to the dihedral angle between the first fixing plate and the second fixing plate is greater than a width of the positioning parts placed away from the dihedral angle between the first fixing plate and the second fixing plate.

2. The corner bracket with reinforcing ribs of claim 1, wherein the pairs of the first reinforcing ribs and of the second reinforcing ribs are arranged symmetrically in parallel to each other, and the locking holes are located between the first reinforcing ribs and the second reinforcing ribs.

3. The corner bracket with reinforcing ribs of claim 1, wherein the dihedral angle is between 45 to 135 degrees.

4. The corner bracket with reinforcing ribs of claim 1, wherein the first fixing plate, the second fixing plate, the first reinforcing ribs and the second reinforcing ribs are all forged integrally by a cold press die.

5. The corner bracket with reinforcing ribs of claim 1, wherein the positioning parts are forged integrally by a cold press die.

6. The corner bracket with reinforcing ribs of claim 1, further comprising a pair of reinforcing curbs, wherein the reinforcing curbs are respectively fixed to two dihedral edges of the connected first fixing plate and the second fixing plate.

* * * * *